United States Patent
Kormann

(10) Patent No.: US 10,444,713 B2
(45) Date of Patent: Oct. 15, 2019

(54) METHOD FOR DISPLAYING THE MACHINING IN A MACHINE TOOL

(71) Applicant: GROB-WERKE GmbH & Co. KG, Mindelheim (DE)

(72) Inventor: Benjamin Kormann, Mindelheim (DE)

(73) Assignee: Grob-Werke GmbH & Co. KG, Mindelheim (DE)

(*) Notice: Subject to any disclaimer, the term of this patent is extended or adjusted under 35 U.S.C. 154(b) by 0 days.

(21) Appl. No.: 15/352,536

(22) Filed: Nov. 15, 2016

(65) Prior Publication Data

US 2017/0139381 A1    May 18, 2017

(30) Foreign Application Priority Data

Nov. 16, 2015 (DE) .................. 10 2015 119 806

(51) Int. Cl.
- *G05B 13/04* (2006.01)
- *G05B 19/4069* (2006.01)
- *G05B 19/418* (2006.01)

(52) U.S. Cl.
CPC ......... *G05B 13/04* (2013.01); *G05B 19/4069* (2013.01); *G05B 19/4187* (2013.01); *G05B 2219/31466* (2013.01); *G05B 2219/35205* (2013.01); *G05B 2219/35217* (2013.01)

(58) Field of Classification Search
CPC .............................. G05B 13/04; G05B 19/418
See application file for complete search history.

(56) References Cited

U.S. PATENT DOCUMENTS

| 5,564,872 A | 10/1996 | Veil et al. | |
| 7,023,436 B2* | 4/2006 | Segawa | G06F 3/011 345/420 |
| 2003/0231793 A1* | 12/2003 | Crampton | G01B 11/2518 382/154 |
| 2009/0187276 A1* | 7/2009 | Nagatsuka | B25J 9/1697 700/245 |
| 2009/0265030 A1* | 10/2009 | Huang | G05B 19/4068 700/182 |
| 2010/0063616 A1* | 3/2010 | Mori | G05B 19/406 700/160 |
| 2010/0153073 A1* | 6/2010 | Nagatsuka | G05B 19/4069 703/1 |
| 2011/0213595 A1* | 9/2011 | Ballmer | B27B 1/007 703/1 |
| 2012/0089247 A1* | 4/2012 | Kawauchi | B23Q 17/20 700/178 |
| 2012/0290122 A1* | 11/2012 | Morfino | G05B 19/4069 700/184 |

(Continued)

FOREIGN PATENT DOCUMENTS

| DE | 102009045298 A1 | 4/2007 |
| DE | 102006059819 A1 | 6/2008 |

(Continued)

Primary Examiner — Vincent H Tran
(74) Attorney, Agent, or Firm — Loginov & Associates, PLLC; William A. Loginov

(57) ABSTRACT

The invention relates to a method for representing the machining operations in the machining area of a machine tool, wherein a tool or workpiece is scanned and the machining process is visualized. The invention relates furthermore to a corresponding machine tool and a corresponding system.

11 Claims, 3 Drawing Sheets

(56) References Cited

U.S. PATENT DOCUMENTS

| | | | | |
|---|---|---|---|---|
| 2013/0030758 A1* | 1/2013 | Suzuki | .................. | B23Q 17/20 |
| | | | | 702/167 |
| 2014/0088949 A1* | 3/2014 | Moriya | .................. | G05B 17/02 |
| | | | | 703/22 |
| 2014/0134580 A1* | 5/2014 | Becker | .................... | G09B 9/00 |
| | | | | 434/234 |
| 2014/0236334 A1* | 8/2014 | Glasscock | .......... | G05B 19/4097 |
| | | | | 700/97 |
| 2015/0105889 A1* | 4/2015 | Tsai | ........................ | G06T 17/00 |
| | | | | 700/98 |
| 2015/0209963 A1* | 7/2015 | Atohira | .................. | B25J 9/1692 |
| | | | | 700/259 |
| 2015/0212516 A1* | 7/2015 | De Schepper | ..... | G05B 19/4097 |
| | | | | 700/182 |
| 2016/0048609 A1* | 2/2016 | Voris | ....................... | G06F 17/50 |
| | | | | 700/98 |
| 2016/0078681 A1* | 3/2016 | Shikoda | ................ | G06T 19/006 |
| | | | | 345/633 |
| 2016/0124424 A1* | 5/2016 | Strong | ............. | G05B 19/41805 |
| | | | | 700/98 |

FOREIGN PATENT DOCUMENTS

| | | | |
|---|---|---|---|
| DE | 102009017795 | A1 | 10/2009 |
| DE | 102008046621 | A1 | 3/2010 |
| DE | 102009029064 | A1 | 4/2010 |
| DE | 102009015934 | A1 | 10/2010 |
| EP | 2216697 | A1 | 8/2010 |

\* cited by examiner

METHOD FOR DISPLAYING THE MACHINING IN A MACHINE TOOL

The invention relates to a method for representing the machining operations in the machining area of a machine tool, a machine tool and a system.

Machine tools are used typically to machine workpieces using suitable tools. In doing so, machining processes such as drilling and milling can be used.

Machine tools frequently have a machining area, in which a clamping device to hold the workpiece is located. The workpiece can then be specifically machined, while it is clamped in the clamping device and/or is located in the machining area. The machining area can be enclosed, but also can be open.

As part of a further automation of machining procedures, it has been shown that it would be advantageous to facilitate better monitoring and control.

The object of the invention is to improve this known prior art.

This is achieved per the invention by a method, a machine tool and a system according to the relevant independent claims. Advantageous embodiments are claimed by way of example in the relevant dependent claims.

The invention relates to a method for representing the machining operations in the machining area of a machine tool, in which a workpiece is machined by a tool by means of the movement of the tool relative to the workpiece. Before the start of machining, a scanner scans at least the workpiece and/or the tool and a three-dimensional data model is created therefrom. The model is recorded in a memory and during the machining of the workpiece, which involves a relative change of position of workpiece and tool, the relevant position information of the workpiece and/or tool is continually supplied to an image data processing unit. The image data processing unit updates the three-dimensional data model from the memory continually with the position information and the thus updated, virtual image of workpiece and/or tool is displayed on a display unit.

The method per the invention allows a particularly advantageous visualization of the machining process taking place in a machine tool such that a particularly extensive and clear monitoring of the machining is possible by the operator. This also permits rapid and targeted interventions, wherein any arising problems can be efficiently recognized and the machining process can be appropriately corrected. It can for example be recognized if a tool is in a position at which an engagement with the workpiece would lead to incorrect machining. Then the machining can for example be stopped by means of suitable inputs or an emergency stop function, which helps to avoid expensive machining errors.

The machining can specifically be metal cutting machining, such as milling or drilling for example.

The three-dimensional data model can for example represent contours, surfaces or edges of the workpiece and/or tool, which have been calculated by scanning. However, existing data relating for example to the contour or specific properties of the workpiece and/or tool can also be accessed. A combination of these two procedures is also possible.

The data model can basically be either a vector model or a pixel model. The workpiece, the tool and any other workpieces and/or other tools or other elements such as contours of the machining area or other devices in the machining area such as brackets or clamping devices can thereby be visualized.

The position information can basically be measured or can also be obtained on the basis of data, which controls the machining, for example NC data or NC programs. With NC programs for example, the relative movement between the workpiece and tool can be controlled. As long as a controlled unit such as a movement drive adheres to the program, the change of position of the tool and/or workpiece is also recognized.

Updating the three-dimensional data model is understood specifically to mean that positional changes of the tool and/or workpiece are adopted into the data model and that a machining of the workpiece by the tool is taken into consideration in the three-dimensional data model, for example by changing the contour of the workpiece. Where applicable, a change of tool due to wear and tear for example can also be given appropriate consideration.

The proposal per the invention means that even during machining, when a visual check might not be possible due to the coolant or lubricant used, this can now be monitored and checked by means of the representation on the screen.

As a three-dimensional data model is available with the movement data being updated in real time, a realistic procedure can be observed on the screen and thereby the viewing direction of the machining can also be chosen freely within the data model, which considerably improves the comfort and machining quality and avoids rejects.

The proposal per the invention also facilitates in a simple way a collision monitoring, as the specific real contours are offset against and represented by the real machining movements. Without using the proposal per the invention, an incorrectly prepared workpiece comprising a disruptive contour would for example remain undiscovered and can thus lead to considerable machine damage.

The image can specifically be produced based on the data model. The image advantageously represents a graphic reproduction of the data model, specifically the workpiece and tool from the data model. The image can be a conventional two-dimensional image, which can be reproduced on conventional screens. The image can however also be a three-dimensional image, which can for example be displayed on 3D screens. The display unit can accordingly be designed for example as a conventional two-dimensional screen or as a 3D screen.

The scanning of the workpiece and/or tool takes place for example in the direction of the machining flow before or in the machining area. By scanning before the machining area, it is possible to avoid positioning the scanner in the machining area, which for example allows a less robust and thus lower-cost design of the scanner. By scanning in the machining area, an advantageous monitoring for example can be realized during a machining process, wherein the scanner does not measure through windows or similar mechanisms, thus improving the measuring accuracy.

In a skillful way, a machine control unit, which causes a positional change to the workpiece relative to the tool by operating at least one drive unit, is provided, wherein the machine control unit transmits position information to the at least one drive and this position information is also supplied to the image data processing unit. The scanned data can thereby be compared for example with the expected properties, which can be determined from the position information. On the basis of the position information for example, the sections of a workpiece or tool requiring special attention can also be calculated, for example due to a risk of damage or incorrect machining and the display can for example be adjusted accordingly. This can considerably improve the operability.

It is understood that the tool, the workpiece or both can basically be moved. An appropriate movement drive can for example be advantageously provided therefore. The workpiece or tool can also be fixed in a permanent bracket, specifically if the other element is moved.

According to a preferred embodiment, at least one position sensor is provided to detect the relevant position of the workpiece and/or tool, which calculates the appropriate position information and supplies it continually to the image data processing unit. Due to the positions, any problems can thereby be ruled out for example, preferably by using the relevant data models. For example, a monitoring can take place to ascertain whether unintended contacts or collisions between the workpiece and tool are occurring. The risk of such collisions can for example be displayed such that a user can react accordingly. An interruption or discontinuance of machining can also be independently initiated to avoid damage. The display can also be influenced, for example optimized, by the position information.

It is preferably selectable on the display unit from which viewing direction and/or in which cutting plane the virtual image should be displayed, wherein the image data processing unit prepares the data model accordingly from this selection information and displays it on the display unit. A 3D mouse or other at least three-dimensional, preferably six-dimensional input device for example can be used for this. The user can thus select advantageously which part of the workpiece and/or tool he would like to see.

The scanner can be arranged specifically on the tool tray of the machine tool and can also remain in the machining area during machining. This permits a particularly close and thus exact recognition of the workpiece or tool. The arrangement on the tool tray typically facilitates a particularly stable but flexibly adjustable position.

The scanner can however also be arranged alternatively on a separate bracket. This can be fixed or moveable.

The scanner can be protected by a cover specifically during the machining. Damage to the scanner, for example as a result of flying chippings from the tool or by fluids used to support the machining process, can thus be avoided. It is however understood that the scanner can also be designed such that it can also remain in the machining area during machining without a cover. A separate cover specifically can thus be avoided.

According to a development, it is provided that in addition to the current situation in the machining area a situation taking place at a future point in the machining area is also representable on the display unit by selection. The relevant current speed vector/s of the element/s moving in the machining area specifically can be calculated in this mode. From this, a future situation can be calculated from the data model for the future point in time and displayed on the display unit. This allows a predictive control, wherein possible problems in the future can already be foreseen and relevant interventions can be taken in the machining. The user can adjust for example how far in advance the specific constellation, specifically of the workpiece and tool, should be displayed. If the user recognizes for example an expectably unwanted machining, the user can stop or change the machining process in time.

A metal cutting machine tool comprising a motor spindle is preferably provided as the machine tool. The motor spindle can specifically also be designed to accommodate a tool for at least a rotative drive unit. The motor spindle can also be designed to accommodate a scanner, wherein the scanner scans specifically during rotation and/or movement of the motor spindle. It can thus be achieved for example that the scanner then only scans if its field of vision has changed or anything else has moved in the machining area. Unnecessary scans, which consume energy and occupy data memory and data transmission capacity but do not provide any additional information, can be advantageously prevented in this way.

It is preferably provided that the scanner scans the machining area before or after the workpiece is transported into the machining area. By scanning before the workpiece is transported into the machining area, the machining area can specifically be measured without the workpiece occurring as a disturbing, visually obstructive element. Appropriate data can for example be used as reference. By scanning after the workpiece has been transported into the machining area, the workpiece can be measured within the context of the machining area.

The invention relates furthermore to a machine tool for the specifically metal cutting machining of a workpiece by a tool. A movement of the tool relative to the workpiece thus occurs in a machining area by at least one movement drive. A scanner is also provided, which scans at least the workpiece and/or the tool and creates a three-dimensional data model therefrom. A memory is also provided to store the data model. An image data processing unit is furthermore provided which continually receives the relevant position information of the workpiece and/or tool during the machining. The image data processing unit continually updates the three-dimensional data model from the memory with the position information. The thus updated, virtual image of workpiece and/or tool is displayed on a display unit.

By means of the machine tool per the invention, the advantages already mentioned in relation to the method per the invention can also be achieved. A considerable improvement is specifically achieved with the monitoring of a machining process, which leads to a marked reduction in machining errors.

It is skillfully provided that the scanner is arranged in the machining area and on the machine tool, in the direction of the machining flow before the machining area. The arrangement in the machining area facilitates a direct scanning during the machining without any disruptive windows or similar. The arrangement before the machining area allows scanning before the introduction into the machining area, thus ensuring that the necessary data is available before the start of machining. In addition, the scanner in this case can be designed more advantageously, as it must not withstand the conditions in the machining area, such as flying chippings or sprayed fluids.

According to a development, it is provided that the scanner is firmly installed in the machining area. This permits scanning even during the machining from a fixed position, which can simplify data management and data analysis. The scanner is advantageously protected by a cover during machining in the machining area. The cover can for example be moveable such that it can be moved into a protective position during machining and can be moved into a non-protective position during an interruption to machining. This is specifically advantageous if the scanner cannot scan through the cover. The cover can specifically protect the scanner from influences such as flying chippings or fluids such that the scanner can be designed to be simpler and thus lower-cost. It is however mentioned that the cover can also be designed such that the scanner can measure through the cover. It can for this purpose be transparent for example in the optical wavelength range or also in another, for example in the infrared or ultra-violet wavelength range.

The scanner can specifically be mountable or usable on the tool tray if necessary, wherein the tool tray carries the tool during the machining. Thus, a separate bracket for the scanner can be avoided, wherein the typically extensive mobility of a tool tray can be relied on at the same time to move the scanner. The scanner can also be incorporated into a frequently pre-existing system for automated replacement of tools. In other words, the scanner can be stored in a magazine next to normal tools and used like a normal tool in the tool tray if a scanning is required.

An at least partially wireless data connection between the scanner and the memory can be provided specifically during the scanning. Cables involving the risk of an entanglement or snapping can thus be avoided. It is however mentioned that cables can also basically be used.

To transmit data between the scanner and the memory, specifically mutually coacting first and second contact faces can be provided, wherein the first contact face or the first contact faces is/are provided on the scanner being usable in the tool tray and the second contact face or second contact faces is/are provided on the tool tray. The memory can specifically thereby be connected conductively with the second contact face(s). The first and second contact faces preferably adjoin each other directly such that an electrical connection between a first contact face and a second contact face is created, specifically when the scanner is incorporated into the tool tray.

Such an embodiment achieves that an electrical connection, specifically to transmit data, is created simply, wherein a normal incorporation of the scanner into the tool tray is typically sufficient therefore. The contact faces then adjoin one another. Complex connectors or wireless transmission techniques can be advantageously avoided.

According to a development, to transmit energy between the scanner and energy feed lines provided on or in the tool tray, mutually coacting first and second contact faces are provided, wherein the first contact face or the first contact faces is/are provided on the scanner being usable in the tool tray and the second contact face or second contact faces is/are provided on the tool tray, and the energy feed line is connected conductively with the second contact face(s). Thus the same advantages are achieved for the transmission of energy which have been described above in reference to the transmission of data.

According to a preferred embodiment, a compressed air-powered generator is provided on the scanner, which provides the power supply of the scanner. The scanner being used in or on the tool tray is thus preferably connected or connectable with a compressed air line such that the compressed air supply of the machine tool powers the generator of the scanner. Thereby a local production of electrical energy is facilitated at the scanner, wherein only compressed air needs to be supplied, which is already available in typical machine tools.

An inductive energy and/or data transmission is preferably provided between the scanner and an energy supply cable or data cable. Thereby the described contact faces can for example be avoided and instead an inductive transmission of energy and/or data can be provided. Problems with possible contaminations of contact faces can thereby be avoided.

A scanner drive unit can specifically be provided for the scanner, which moves the scanner during the scanning. This facilitates an independent movement of the scanner and the possible provision of an increased movement range for the scanner, specifically in comparison to the movement range of tools being found in the tool tray. Alternatively or additionally, it can also be provided that the scanner is moved by the tool tray. This allows a simple embodiment without additional components, wherein the typically existing mobility of the tool tray can be relied upon.

According to the relevant embodiments, the scanner can be designed as a strip light scanner, line scanner, laser triangulation scanner, radar scanner, sonar scanner or optical scanner. The advantages of the relevant scanning principle can thus be made usable.

The invention relates furthermore to a system, which comprises a machine tool and a scanning station being provided in the machining flow before the machine tool. The scanning station comprises a scanner for scanning at least a workpiece and/or tool. The scanner creates a three-dimensional data model with at least one of the elements such as the workpiece in the machining area. A memory is also provided to store the data model. An image data processing unit continually receives the relevant position information of the workpiece and/or tool during the machining. The image data processing unit continually updates the three-dimensional data model from the memory with the position information and displays the thus updated, virtual image of workpiece and/or tool on a display unit.

Using such a system, the aforementioned advantages of a scanning when machining a workpiece can be made useable. By arranging the scanning station in the machining flow before the machine tool, it can be specifically understood that a workpiece and/or tool initially passes through the scanning station in a conventional machining flow, is typically scanned there and then introduced into the machining area. The scanning station can for example be spatially arranged in front of an opening of the machining area.

The three-dimensional data model can specifically include the workpiece and/or tool. With an update, it can be specifically understood that the position information is used to calculate how workpiece and/or tool actually change regarding their position, such that this change is also considered in the data model.

In this context, it is specifically noted that all characteristics and properties described in relation to the device, here specifically the machine tool and/or system, as well as procedures are transferable in relation to the formulation of the method per the invention and are useable in the sense of the invention and are considered co-disclosed. The same applies in the reverse direction, that is, only structural features, i.e. features per the device, being stated in relation to the procedure, can also be considered and claimed within the scope of the device claims and are also included in the disclosure.

In the drawing the invention is specifically shown schematically in embodiments. In the drawings.

Figure 3:
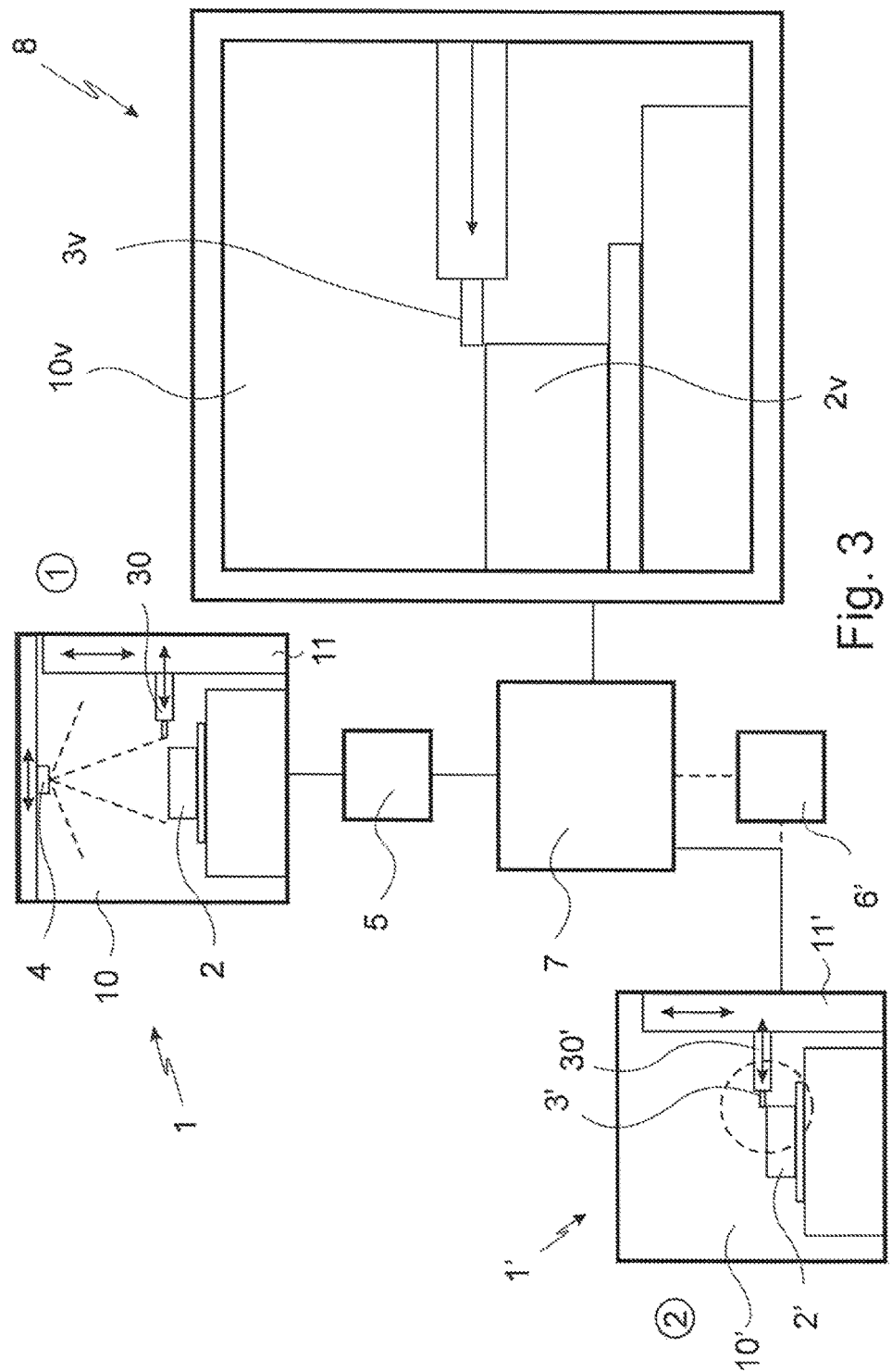

FIG. 3 a machine tool per the invention.

In the figures, identical or corresponding elements are each identified by the same reference numerals and will not therefore, if not appropriate, be described again. The disclosures contained in the entire description are transferable correspondingly to the same parts with the same reference numerals or same component descriptions. The position specifications selected in the description, such as above, below, lateral, etc., are also related to the directly described and shown figure and can be transferred correspondingly to the new position in the case of a change of position. Furthermore, specific features or combinations of features from the illustrated and described different embodiments can represent independent inventive solutions or solutions per the invention.

Figure 1:
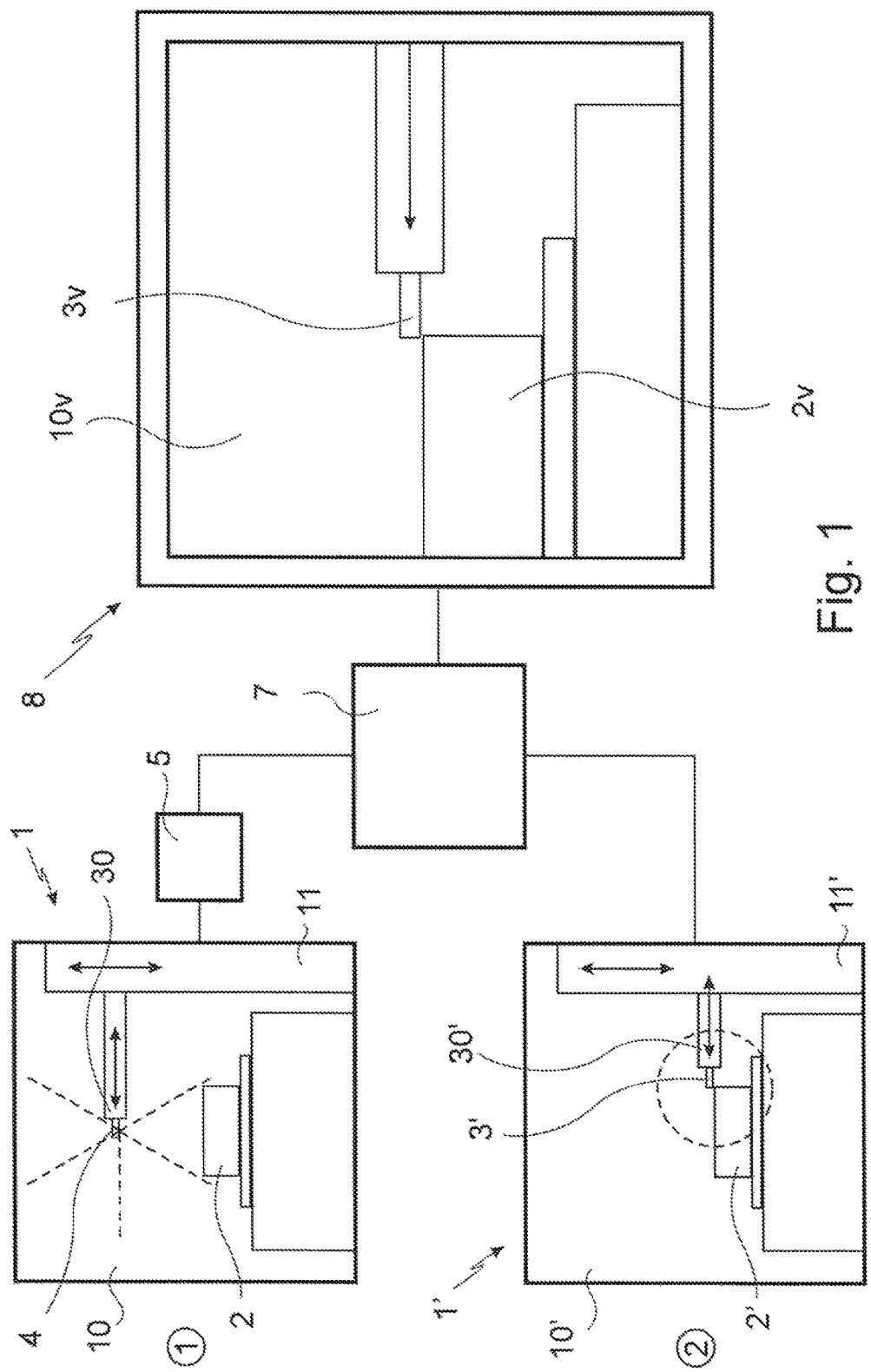
FIG. 1 shows a machine tool per the invention.

FIG. 1 shows a machine tool 1 per an embodiment of the invention. The machine tool 1 is shown in two states, wherein a first state is shown with the encircled number 1 and a second state with the encircled number 2. The reference numerals, which are shown for the second state, have been marked with an apostrophe for better distinguishability. If nothing specific is marked subsequently on a status, the relevant embodiments shall apply basically for both states.

The machine tool 1 (or machining area 1' in the second state) comprises a machining area 10 (or machining area 10' in the second state). In this, a workpiece 2 (or workpiece 2' in the second state) is specifically located, which should be machined by means of the machine tool 1.

The machine tool 1 comprises a movement drive 11 (or movement drive 11' in the second state) and a thus connected tool tray 30 (or tool tray 30' in the second state). The movement drive 11 is also designed to hold and three-dimensionally position the tool tray 30, i.e. to move it. There are thus two possible movement directions shown in FIG. 1, namely in the horizontal direction and in the vertical direction. A further movement direction is transverse to the paper plane of FIG. 1. This allows a free positioning of the tool tray 30 in the machining area 10.

The workpiece 2 rests on an unspecified support. It is typically fixed here and/or clamped such that it retains its position exactly even upon exertion of a pressure by a tool.

In the first state, a scanner 4 is included in the tool tray 30. This scanner 4 is also designed to scan the machining area 10 of the machine tool 1 completely and specifically inclusive of the workpiece 2. The exact contours of the workpiece 2 can thereby be recorded. The movement drive 11 can specifically be used for this, by means of which the scanner 4 can be moved around the workpiece 2 or positioned at different locations adjacent to the workpiece 2. The scanned contours of the workpiece 2 can for example also be used to inspect the workpiece 2. They can for example be compared with stored target data. Any deviations can for example indicate a damaged workpiece or defective workpiece.

A scan of the machining area 10 can also specifically be used to carry out a comparison with target data. For example, damages or possible hazard sources such as foreign bodies can be thereby recognized.

The scanner 4 can not only be moved by the movement drive 11, but also can be rotated in the tool tray 30. This corresponds to a typical functionality of such a tool tray 30, in which for example drills can also be used for conventional drilling of holes, which are rotated in typical usage.

The scanner 4 can specifically scan on all sides, which is represented by the three dotted lines in FIG. 1, first state. This can for example be achieved by the rotatability just mentioned.

The scanning of workpiece 2 takes place preferably before the start of machining. This can occur specifically in the first state of FIG. 1. The data being relevant for the machining can thereby be collected, specifically relating to the visualization of the data described below.

The data generated by the scanner 4, which specifically reproduces the contour of workpiece 2 and the structure of the machining area 10, is supplied to a memory 5. This occurs in the present case through an electrical connection, which is produced through coacting contact faces on the scanner 4 and on the tool tray 30. An error-prone plug and complex wireless transmission can thereby be avoided.

The data stored in the memory 5 forms specifically the basis for a visualization of the machining process, which is described in more detail below. In the memory 5, data about various workpieces, different machining points and/or different tools can be saved.

An image data processing unit 7 is communicatively connected with the memory 5. The image data processing unit 7 is also formed to read the above-mentioned data, which was produced by the scanner. Further details about the functionality of the image data processing unit 7 will be given below.

In the second state, which is also visualized in FIG. 1 as previously mentioned above, the actual machining of the workpiece 2 occurs. The scanner 4 was therefore replaced by a tool 3 (or tool 3'), in the form of a drill in the present case, which can drill holes into the workpiece 2. The tool 3 can also be moved three-dimensionally through the machining area 10 by means of the movement drive 11 as described above with reference to the scanner 4 and can furthermore be rotated such that a conventional drilling procedure is facilitated.

By means of the image data processing unit 7 being described above, the machining process, during which the workpiece 2 is machined using tool 3, can be visualized. A display unit 8 in the form of a screen also serves for this purpose. This screen is communicatively connected with the image data processing unit such that image data can be transmitted from the image data processing unit 7 to the screen and can be displayed there.

The image data processing unit 7 is also communicatively connected with the movement drive 11. The image data processing unit 7 thereby continually receives information about movements, which the movement drive 11 performs with the tool 3.

The image data processing unit 7 uses both the information read out from the memory 5 and the information concerning movements from the movement drive 11 to visualize the machining process. A known starting position of the tool 3 can for example thereby be used as the starting point and relative to this changes in the position of the tool 3 are calculated on the basis of data concerning the movements of the movement drive 11.

The data produced by the scanner 4 relating to the workpiece 2 is available through the memory 5. This means that the image data processing unit 7 is informed about the contours of the workpiece 2 in the starting state.

Based on the data concerning the movement of the tool 3, the image data processing unit 7 continually calculates whether a contact is occurring between the workpiece 2 and the tool 3. In case of such a contact, the image data processing unit 7 also calculates how the workpiece 2 is machined by the tool 3. This can for example mean that a penetration of the tool 3 into the workpiece 2 is recognized and a removal of material from the workpiece 2 is assumed at the relevant position.

Based on the aforementioned information and the employed calculations, the image data processing unit 7 creates a visualization of the machining process, which is displayed on the display unit 8. The visualization includes a visualized machining area 10v, a visualized workpiece 2v and a visualized tool 3v. Changes to the position of the tool 3v and changes to the contour of workpiece 2v, generated by a machining by means of tool 3v, can also thereby be displayed. This facilitates a visual inspection of the machining process in real-time for a user. It is thereby emphasized that the data concerning the workpiece 2 is not just based on an assumption, but on three-dimensional data being measured directly before the machining, which has been acquired by means of the scanner 4.

By means of the described procedure, it is also possible to carry out a projection of the machining process. A projection of the movement of the tool 3 can hereby be used in a similar way to a movement of the tool 3 being calculated or determined on the basis of received data. This enables the operator to visually inspect the estimated result of a certain machining process in advance before a corresponding machining takes place. By means of the not-shown input means for example, the user can select how many seconds or minutes in advance the planned machining should be displayed. On the basis of the relevant machining data, for example NC data, the image data processing unit 7 can then project the expected movement of the tool 3 and a resulting machining of workpiece 2 can also be projected. The representations of the visualized workpiece 2v and the visualized tool 3v can be accordingly adapted such that the user can recognize the expected machining.

If the user for example recognizes that the planned or projected machining of workpiece 2 would lead to an undesired result, the user can intervene in good time and for example terminate or change the machining process.

Figure 2:
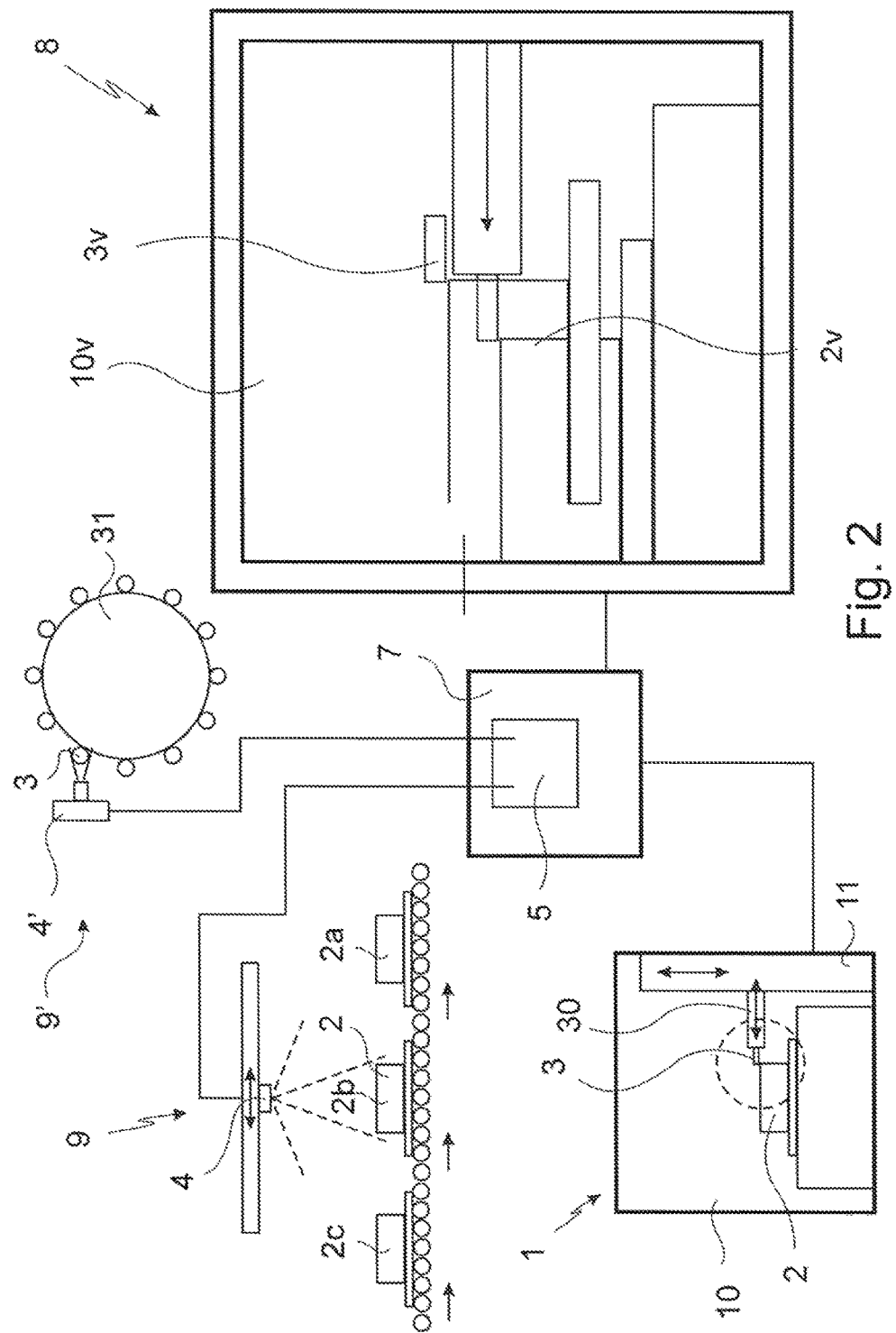
FIG. 2 shows a system per the invention.

FIG. 2 shows a system according to the invention, which comprises a machine tool 1 and a scanning station 9. The machine tool 1 is formed in a similar manner as described above with reference to FIG. 1. It specifically comprises a tool tray 30, in which both a tool 3 and a scanner 4 can be used. As in the embodiment per FIG. 1, an electrical connection can be created between the scanner 4 and a memory 5 by means of not-shown contact faces.

The memory 5 is in this case not arranged externally to the image data processing unit 7, but rather integrated into this. This changes nothing of the above-described functionalities.

The scanning station 9 is also formed to scan workpieces 2 prior to the machining, specifically before their introduction into the machine tool 1 and to thereby record their contours. For this purpose, the scanning station 9 comprises a scanner 4, which is formed in a similar manner to the scanner 4 described above with reference to FIG. 1.

Three workpieces 2 are displayed in this case, namely a first workpiece 2a, a second workpiece 2b and a third workpiece 2c. These workpieces 2 are passed under the scanner 4 on a schematically shown conveyor belt, wherein their contours are recorded by means of the scanner 4.

The scanner 4 of scanning station 9 is connected with the memory 5 such that data being recorded by the scanner 4 can be written to the memory 5 and can be processed by the image data processing unit 7 in a similar manner as described above.

In the embodiment of FIG. 2, a spatial separation between the scanning process and the machining process therefore occurs. A scanning of the workpiece 2 to be machined occurs outside the machining area 10. The relevant workpiece 2 is only introduced into the machining area 10 after the scanning. In the normal case, a scanning within the machining area 10 can therefore be omitted, which specifically saves time.

The relevant workpiece 2 is typically placed in a defined position in the machining area 10 such that the image data processing unit 7 can execute a visualization and projection of the machining process in a very similar way as described above with reference to FIG. 1.

The system of FIG. 2 comprises furthermore an additional scanning station 9'. This is used to scan different tools 3.

It is thus schematically shown that a plurality of tools 3 are attached to a drum 31. This facilitates a simple and automated storage and selection of tools 3 for machining within the machining area 10. The additional scanning station 9' comprises an additional scanner 4', which is also designed to scan tools 3 in the drum 31 or upon removal from the drum 31. The contours of the relevant tool 3 can thereby be defined. On one hand, this supplies original data for the calculation being executed in the image data processing unit 7. On the other hand, by comparison with prior data being based on scanning procedures or with target data, any change to the relevant tool 3 can thereby be recognized, which can for example be based on damages or wear. If such deviations are recognized, the tool 3 can for example be disposed of. A postprocessing can also be conducted.

By means of the embodiment shown in FIG. 2, a visualization of a machining procedure can be carried out in a very similar way as described above with reference to FIG. 1. The data obtained outside of the machining area 10 is thereby typically relied upon such that a scanning procedure within the machining area 10 can typically be omitted. Time is thereby generally saved, which facilitates a higher throughput of the tool machine 1.

It is however understood that a scanner 4 can also be used in the tool tray 30 in the embodiment shown in FIG. 2 such that a scanning within the machining area 10 can be executed in a way similar to that described above with reference to FIG. 1. This can specifically then occur if a monitoring during a machining procedure is required or if the data produced before the machining comprises visual discrepancies.

FIG. 3 comprises a machine tool 1, which shows an alternative embodiment in comparison to the machine tool 1 shown in FIG. 1. In the embodiment per FIG. 3, the scanner 4 is not clamped by the tool tray 30, instead it is in fact moveably mounted to the upper side on the cover of the machining area 10. The scanner 4 can thereby be displaced such that a scanning of the entire machining area 10 is possible. Thus the initial mounting of a scanner 4 in the tool tray 30 before the machining process and the substitution of a tool 3 after the scanning can thereby be avoided. This can specifically reduce the machining time. In the embodiment per FIG. 3, the scanner 4 can also move along a predefined line such that specifically in the case where its position is measured simultaneously, irrespective of the movement drive 11, a particularly exact position of the scanner 4 can be determined.

Typically in the embodiment of FIG. 3, the workpiece 2 is introduced into the machining area 10 and then the machining area 10 including the workpiece 2 is measured by means of the scanner 4. The scanner 4 is thereby typically moved over a certain route. The thus-recorded data is saved in a memory 5 as described in the other embodiments, which the image data processing unit 7 can in turn access. This in turn also receives data about the movements of the movement drive 11 such that the above-described visualization can be advantageously executed.

The state during the scanning is identified in FIG. 3—similarly to in FIG. 1—as the first state with the number 1 in a circle. The state during machining is in contrast identified as the second state with the number 2 in a circle.

An image data processing unit 7 is continually provided with the relevant position information of the workpiece 2 and/or tool 3 during the machining. A position monitoring unit 6' is provided for this purpose, which is for example a part of the machine control of the machine tool 1.

The invention claimed is:

1. A method for representing machining operations in a machining area of a machine tool, in which a workpiece is machined by a tool with movement of the tool relative to the workpiece, comprising the steps of:

before the start of machining, scanning, with a scanner, at least the workpiece and/or the tool and creating a three-dimensional data model therefrom;

recording the model in a memory;

during the machining of the workpiece, which includes a relative change of position of workpiece and tool, continually supplying relevant position information of the workpiece and/or tool to an image data processing unit;

continually updating, in the image data processing unit, a three-dimensional data model from the memory with the position information; and displaying an updated, virtual image of workpiece and/or tool on a display unit, wherein a metal cutting machine tool comprising a motor spindle is provided as the machine tool, which motor spindle accommodates a tool for at least one rotative drive unit, and the motor spindle is also arranged to accommodate a scanner.

2. A method according to claim 1, the step of scanning of the workpiece and/or tool takes place in the direction of a machining flow before or in the machining area.

3. A method according to claim 1, wherein a machine control unit, which causes a positional change to the workpiece relative to the tool by operating at least one drive unit, is provided, wherein the machine control unit transmits position information to the at least one drive and also supplies this position information to the image data processing unit.

4. A method according to claim 1, wherein at least one position sensor is provided to detect the relevant position of the workpiece and/or tool, which calculates the appropriate position information and supplies it continually to the image data processing unit.

5. A method according to claim 1, wherein the display unit defines a selectable viewing direction and/or in which cutting plane the virtual image is displayed and the image data processing unit prepares the data model accordingly with respect to the selectable viewing direction and displays the data model on the display unit.

6. A method according to claim 1, wherein the display unit is arranged to include a mode in which the display unit selectively allows display of future machining in the machining area, wherein the relevant current speed vector/s of the element/s moving in the machining area is calculated in the mode and from the calculation, the future machining is calculated from the data model for the future point in time and displayed on the display unit.

7. A method according to claim 1, wherein the scanner scans specifically during rotation and/or movement of the motor spindle.

8. A machine tool for metal cutting machining of a workpiece by a tool, wherein a movement of the tool occurs relative to the workpiece in a machining area, comprising:

at least one movement drive and a scanner, which scans at least the workpiece and/or the tool and creates a three-dimensional data model therefrom;

a memory to store the data model; and an image data processing unit that continually receives relevant position information of the workpiece and/or tool during the machining, and wherein the image data processing unit continually updates the three-dimensional data model from the memory with the position information and displays an updated, virtual image of workpiece and/or tool on a display unit, wherein a metal cutting machine tool comprising a motor spindle is provided as the machine tool, which motor spindle accommodates a tool for at least one rotative drive unit, and the motor spindle is also arranged to accommodate a scanner.

9. A machine tool according to the claim 8, wherein the scanner is arranged in the machining area and on the machine tool, in a direction of machining flow before the machining area.

10. A machine tool according to claim 9, wherein (a) the scanner is firmly installed in the machining area, and wherein the scanner is protected by a cover during machining in the machining area or (b) the scanner is arranged to be mountable or usable on a tool tray, and wherein the tool tray carries a tool during the machining.

11. A machine tool according to claim 8, wherein during the scanning, an at least partially wireless data connection is provided between the scanner and the memory.

* * * * *